United States Patent [19]

Nagle et al.

[11] Patent Number: 4,943,301

[45] Date of Patent: Jul. 24, 1990

[54] GRANULATION OF MAGNESIUM OXIDE PARTICLES

[75] Inventors: Dennis C. Nagle, Ellicott City; Richard H. Van de Walle, Columbia, both of Md.

[73] Assignee: Martin Marietta Magnesia Specialties Inc., Hunt Valley, Md.

[21] Appl. No.: 225,878

[22] Filed: Aug. 1, 1988

[51] Int. Cl.$^5$ .......................... C04B 2/00; C01F 5/02; C01F 5/16

[52] U.S. Cl. .............................. 23/313 R; 23/313 P; 423/164; 423/636; 423/640

[58] Field of Search ............... 423/164, 635, 636, 640; 23/313 R, 313 FB, 313 P

[56] References Cited

U.S. PATENT DOCUMENTS 3,598,618 8/1971 Fuji et al. .............................. 23/313
3,748,282 7/1973 Evans .................................. 423/164

FOREIGN PATENT DOCUMENTS 592431 2/1978 U.S.S.R. ............................. 423/635

Primary Examiner—Gary P. Straub
Attorney, Agent, or Firm—Gay Chin; Herbert W. Mylius

[57] ABSTRACT

Magnesia pellets are formed from finely-divided, highly reactive, lightburned magnesia (MgO) particles by granulating such powders in conventional equipment using either an organic liquid or an organic liquid-binder mixture. The organic liquid may be an alcohol or a ketone the alkyl groups of which, independently, can have from 1 to 4 carbon atoms. Magnesium chloride and water are among disclosed binders which may be used in combination with said organic liquid. The organic liquid should be more than about 80% of any admixtures with water.

15 Claims, No Drawings

GRANULATION OF MAGNESIUM OXIDE PARTICLES

TECHNICAL FIELD

This invention relates to increasing the particle size of highly reactive, lightburned magnesia (MgO) and, more particularly relates to an effective method of pelletizing MgO, while preventing slaking.

BACKGROUND OF THE INVENTION

Reactive magnesium oxide has numerous applications in industry and commerce, such as in animal feed additives, fertilizers, and flue gas conditioners. For such exemplary applications, a free flowing material with a specified particle size and chemical purity is demanded, having a surface area of at least 10 square meters per gram or higher, but preferably twenty square meters per gram or higher.

Typically, highly reactive magnesia is produced by reacting magnesium chloride solutions, such as derived from sea water or magnesium chloride brines, with lime (CaO) or a dolomitic lime (MgO:CaO) to precipitate insoluble magnesium hydroxide, [Mg(OH)$_2$]. The magnesium hydroxide is then calcined to the desired reactivity in a rotary kiln. The magnesium oxide product is often difficult to handle due to its poor flow properties and fine particle size, greater than 98% usually passing through a 200 mesh screen.

For most of its industrial applications it is desirable to employ a reactive magnesia having a relatively large particle size in order to minimize dusting. Other advantages for the larger particle size include ease of handling and ease of blending with other materials such as fertilizers. However, a satisfactory granulation process has yet to become known which does not involve substantial slaking of the magnesia, thereby altering the chemical reactivity and purity, and reducing magnesium value of the product.

U.S. Pat. No. 3,748,282 to Evans, for example, teaches producing magnesium oxide compositions in shaped forms, such as tablets and pellets, by slaking a quantity of particulate magnesium oxide with an aqueous solution containing from about 10 to 70% by volume, of a volatile, water miscible alcohol or ketone, thereby converting between about 30% to about 85%, by weight, of the magnesium oxide to magnesium hydroxide. The slaked mixture is then sequentially dried, granulated, shaped and calcined to convert a proportion of the magnesium hydroxide back to magnesium oxide, so that the shaped composition contains about 35% to about 55%, by weight of magnesium hydroxide. The total content of organic compound in the slaked mixture is completely vaporized during the drying and calcining operations. However, the very high proportion of magnesium hydroxide in the shaped product makes it unsuitable for any application requiring highly reactive and chemically pure magnesia.

SUMMARY OF THE INVENTION

It is therefore, the principle object of this invention to increase the particle size of highly reactive, lightburned magnesia.

It is a further object of this invention to provide a method of granulating finely divided magnesium oxide particles without altering chemical reactivity and purity.

Thus, in accordance with these and other objects, the present invention constitutes a method of pelletizing magnesia by adding to dry particulate lightburned magnesia a liquid organic material selected from alkyl alcohols or ketones to form granules, and drying the granules to volatilize the liquid organic material. Binders such as magnesium chloride and water may be present, in minor proportion, with the liquid organic material. Other objects and advantages will be apparent from the description which follows, which is intended only to disclose and illustrate the invention and in no way to limit it.

DESCRIPTION OF PREFERRED EMBODIMENTS

This invention is based upon the discovery that highly reactive, lightburned magnesia powder can be pelletized using organic liquids or organic liquid-binder mixtures. The method does not require any specifically designed or manufactured machines, but rather, utilizes conventional equipment, such as the mix pelletizer manufactured and sold by Eirich Machines, Ltd. of Ontario, Canada. In a typical granulation procedure, dry MgO powder is added to the pelletizer and the organic liquid is added and blended until the powder forms granules. If too much liquid has been added and the granules are excessively wet, additional dry powder may be "dusted" into the mix to form the desired consistency. The granules are thereafter dried by any of a number of conventional techniques, thereby removing all traces of the organic liquid material.

Organic liquids which can be employed in the method of the instant invention include alcohols and ketones having, respectively, the general formulae:

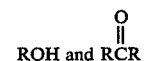

$$ROH \text{ and } RCR$$

wherein each R, independently, is an alkyl group having from 1 to 4 carbon atoms. Organic liquids preferred for use in this invention are methanol, iso-butanol, acetone and methylethyl ketone. Mixtures of such compounds are also effective. As indicated, the amount of organic liquid employed is dependent upon the consistency of the mixture of MgO and organic liquid, and will be dependent upon such factors as MgO powder size. In general, the organic liquid may comprise from about 20 to about 40 weight percent of the total mixture in the pelletizer, and preferably from about 25 to about 35 weight percent.

In order to obtain pellets having a hardness factor greater than that achieved with a pure organic liquid material, a binder additive may be incorporated in the powder-organic liquid system. A typical binding agent is magnesium chloride. Other suitable binders may include sulfuric acid, lignosulfonates or soluble organic acids such as sulfonic acids. The amount of binding agent used in the granulation operation should remain low, particularly where it reacts with the MgO powder, as in the case of magnesium chloride. Typically, the amount of binding agent utilized should not exceed 10 percent by weight of the total mixture of material, and preferably should be less than 5 percent of the total mixture being blended.

Water in carefully controlled amounts also functions as a binder according to the present invention. In such instances, a quantity of Mg(OH)$_2$ is formed by hydration to harden and strengthen the pellets. However, as a consequence of the hydration, the magnesium value of the resultant product is reduced. Hardened pellets are customarily preferred in applications which involve excessive handling such as where the MgO pellets are mixed or blended with one or more required materials, e.g., animal feed ingredients and fertilizers. To prevent inordinate hydration of the reactive MgO during pelletization, the use of water as a binding agent should be minimized. No more than about 20%, and preferably less than about 10% water, based on the weight of the organic liquid material, should be used in such solutions. For certain applications, water can be combined with one of the above-named binders. Specific concentrations of such binders in the granulation mix are often determined by the intended end use of the pellets.

EXAMPLES

In the following examples, illustrative of this invention, −200 mesh MgO was granulated in an Eirich mixer using methanol as the organic liquid, either alone or together with one of the binder compositions described above. The agitator speed and pan speed of the mixer were adjusted to maximize the yield for a fertilizer grade product having a −6+16 mesh size. Average surface area, as measured by the B.E.T. nitrogen absorption technique, exceeded 10 square meters per gram of MgO. The compiled data for each of the examples are averages of three separate experiments. All concentrations are ±0.1%, and all percentages are based on weight of the total mix.

| Formulation | EXAMPLES | | | |
| --- | --- | --- | --- | --- |
| | 1 | 2 | 3 | 4 |
| % MgO | 75.1 | 69.7 | 73.3 | 70.0 |
| % Methanol | 24.9 | 26.8 | 25.4 | 26.2 |
| % H$_2$O | | 3.5 | | |
| % Sat. MgCl$_2$ Solution | | | 1.3 | |
| % Calcium Lignin Sulfonate (58% liquid) | | | | 3.8 |
| −6 + 6 Screen Fraction (%) (Experimental Range +/− 5%) | 66 | 71 | 70 | 73 |

While the products described in the above samples find particular utility in the plant food industry, granulated magnesia products according to this invention may also be useful in the manufacture of fuel additives and flue gas scrubbers and in the metal products and industries, particularly in iron ore reduction and in aluminum alloys manufacture.

The invention has been described with special regard for certain preferred embodiments. However, modifications and changes that would be obvious to a skilled artisan may be made in the disclosed method without departing from the spirit and scope of the invention which is defined by the appended claims.

We claim:

1. A method of granulating highly reactive, lighburned magnesia having a surface area of at least ten square meters per gram as measured by the B.E.T. nitrogen absorption method, said method consisting of adding to dry magnesia powder 20-35 percent by weight of the total mixture of liquid organic material selected from alcohols or ketones having the formulae, respectively:

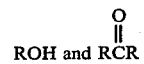

wherein each R, independently, is an alkyl group having from 1 to 4 carbon atoms, and wherein said liquid organic material contains no more than about 20 percent by weight water, blending said materials to thereby form granules, and drying the granules to volatilize said liquid organic material.

2. The method according to claim 1 wherein said liquid organic material consists of a mixture of alcohols, a mixture of ketones, or a ketone-alcohol mixture.

3. The method according to claim 1 wherein said liquid organic material is selected from the group consisting of methanol, iso-butanol, acetone and methylethyl ketone.

4. The method according to claim 3 wherein said liquid organic material is a mixture of two or more of compounds from said group.

5. The method according to claim 4 wherein said liquid organic material includes an additive binding agent selected from the group consisting of magnesium chloride, sulfuric acid, lignosulfonates, and sulfonic acids.

6. A method of granulating highly reactive, lighburned magnesia, said method consisting of adding to dry magnesia powder 20-35 percent by weight of the mixture of a solution of water in a liquid organic material containing not less than about 80% of said liquid organic material and not more than about 20% of said water, wherein said liquid organic material is selected from alcohols or ketones having the formulae, respectively:

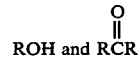

wherein each R, independently, is an alkyl group having from 1 to 4 carbon atoms, blending said materials to thereby form granules, and subsequently drying the granules.

7. The method according to claim 6 wherein said liquid organic material consists of a mixture of alcohols, a mixture of ketones, or a ketone-alcohol mixture.

8. The method according to claim 6 wherein said solution contains greater than about 90% of said liquid organic material.

9. The method according to claim 6 wherein said liquid organic material is selected from the group consisting of methanol, iso-butanol, acetone and methylethyl ketone.

10. The method according to claim 6 wherein said liquid organic material is a mixture of two or more compounds from said group.

11. The method according to claim 6 wherein said solution also contains a binding agent selected from the group consisting of magnesium chloride, sulfuric acid, lignosulfonates, and sulfonic acids.

12. The method according to claim 11, wherein the binding agent constitutes less than 20 per cent by weight of the liquid organic material.

13. A method for granulating highly reactive, lighburned magnesia said method consisting of blending said magnesia with 20-35 percent by weight of an aqueous solution comprising at least 80 percent by weight of a liquid organic compound selected from the group consisting of alkyl alcohols and alkyl ketones having from 1 to 4 carbon atoms, or mixtures thereof, thereby forming granules, and drying said granules.

14. The method to claim 13 wherein said liquid organic compound is selected from the group consisting of methanol, iso-butanol, acetone, and methylethyl ketone.

15. The method according to claim 13 wherein said liquid organic compound includes a binder additive selected from the group consisting of magnesium chloride, sulfuric acid, lignosulfonates, and sulfonic acids.

* * * * *